(12) United States Patent
Boezen

(10) Patent No.: US 8,305,099 B2
(45) Date of Patent: Nov. 6, 2012

(54) HIGH SPEED FULL DUPLEX TEST INTERFACE

(75) Inventor: Henk Boezen, Nijmegen (NL)

(73) Assignee: NXP B.V., Eindhoven (NL)

( * ) Notice: Subject to any disclaimer, the term of this patent is extended or adjusted under 35 U.S.C. 154(b) by 25 days.

(21) Appl. No.: 12/873,236

(22) Filed: Aug. 31, 2010

(65) Prior Publication Data
US 2012/0049872 A1 Mar. 1, 2012

(51) Int. Cl.
G01R 31/3187 (2006.01)

(52) U.S. Cl. ......... 324/750.3; 324/762.01; 324/756.06; 324/527

(58) Field of Classification Search ............. 324/754.18, 324/756.06; 714/699
See application file for complete search history.

(56) References Cited

U.S. PATENT DOCUMENTS

| | | | | |
|---|---|---|---|---|
| 4,162,371 A * | 7/1979 | Belforte | ......... | 370/284 |
| 5,101,153 A * | 3/1992 | Morong, III | ......... | 324/537 |
| 5,541,535 A * | 7/1996 | Cao et al. | ......... | 326/83 |
| 6,016,566 A * | 1/2000 | Yoshida | ......... | 714/736 |
| 6,275,023 B1 * | 8/2001 | Oosaki et al. | ......... | 324/756.06 |
| 7,119,547 B2 * | 10/2006 | Matsuura et al. | ......... | 324/537 |
| 7,792,196 B2 * | 9/2010 | Sheiman et al. | ......... | 375/257 |
| 2004/0187049 A1 * | 9/2004 | West | ......... | 714/699 |
| 2010/0148826 A1 * | 6/2010 | Kojima | ......... | 327/80 |

* cited by examiner

*Primary Examiner* — Richard Isla Rodas

(57) ABSTRACT

A full duplex, high speed test interface comprises a tester side circuit and a device under test side circuit, each comprising balancing circuits. The balancing circuit of the test side circuit is configured to cancel its own transmitted data at the test side circuit such that the transmitted data does not influence any other signal generated at the test side circuit. Similarly, the balancing circuit of the device under test side circuit is configured to cancel its own transmitted data at the device under test side circuit such that the transmitted data does not influence any other signal generated at the device under test side circuit.

17 Claims, 4 Drawing Sheets

HIGH SPEED FULL DUPLEX TEST INTERFACE

Embodiments of the invention relate to a test interface, and more particularly to a high speed full duplex test interface.

A test interface may be employed to perform a scan test on digital circuitry, such as integrated circuits, and analog circuitry. During the fabrication process or during continued use of digital or analog circuits faults may occur, which may lead to the digital or analog circuits not meeting the performance specifications within the normal range of operating conditions. To test the performance and detect faults in various circuits, boundary scans, such as the "Joint Test Action Group" (JTAG) boundary scan may be used to shift test parameters in and out of a circuit to be tested.

Testing may be done at the wafer testing step during the fabrication process and may use dedicated test pads to perform the test. However, it is preferred to be able to test the final product even when the dedicated test pads are no longer accessible. During testing, test vectors must be shifted in and out of the device under test at high speed in order to limit the test time. Furthermore, full duplex operation is preferred, in which communications occur between the tester and device under test in both directions at the same time. Full duplex operation eliminates the need for temporary storage of the test signals and further reduces the test time compared to half duplex operation. Often, the tester sending and receiving the test vectors is connected to the device under test via a long cable, which may limit the test speed. Furthermore, scan tests require additional input/output (I/O) pins to be implemented in the circuitry to be able to perform the scan tests. For example, the JTAG boundary scan requires at least 4 dedicated I/O pins in addition to the standard I/O pins of the circuits. However, some circuits, for example magneto resistance (MR) sensors only have two pins and a typical boundary scan may not be performed on such devices.

A full duplex, high speed test interface comprises a tester side circuit and a device under test side circuit, each comprising balancing circuits. The balancing circuit of the test side circuit is configured to cancel its own transmitted data at the test side circuit such that the transmitted data does not influence any other signal generated at the test side circuit. Similarly, the balancing circuit of the device under test side circuit is configured to cancel its own transmitted data at the device under test side circuit such that the transmitted data does not influence any other signal generated at the device under test side circuit.

A test circuit comprises a tester side circuit including a first balancing circuit, and a signal source coupled to the first balancing circuit, whereby the signal source is configured to generate a first test signal. The first balancing circuit is configured to produce a test result signal as a result of a response signal, the response signal being a consequence of a device under test receiving a second test signal related to the first test signal, and the test result signal is independent of the first test signal.

The test circuit may further comprise a device under test interface including a second balancing circuit. The second balancing circuit is configured to produce the second test signal as a result of receiving the first test signal from the signal source, and the second test signal is independent of the response signal.

The tester side circuit and the device under test interface may be connected via a transmission line, and the first test signal and the response signal are transmitted over the transmission line. The first test signal and the response signal may be transmitted over the same wire of the transmission line. Furthermore, the transmission line may be terminated at the device under test interface and/or the tester side circuit.

Other aspects and advantages of the present invention will become apparent from the following detailed description, taken in conjunction with the accompanying drawings, illustrated by way of example of the principles of the invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
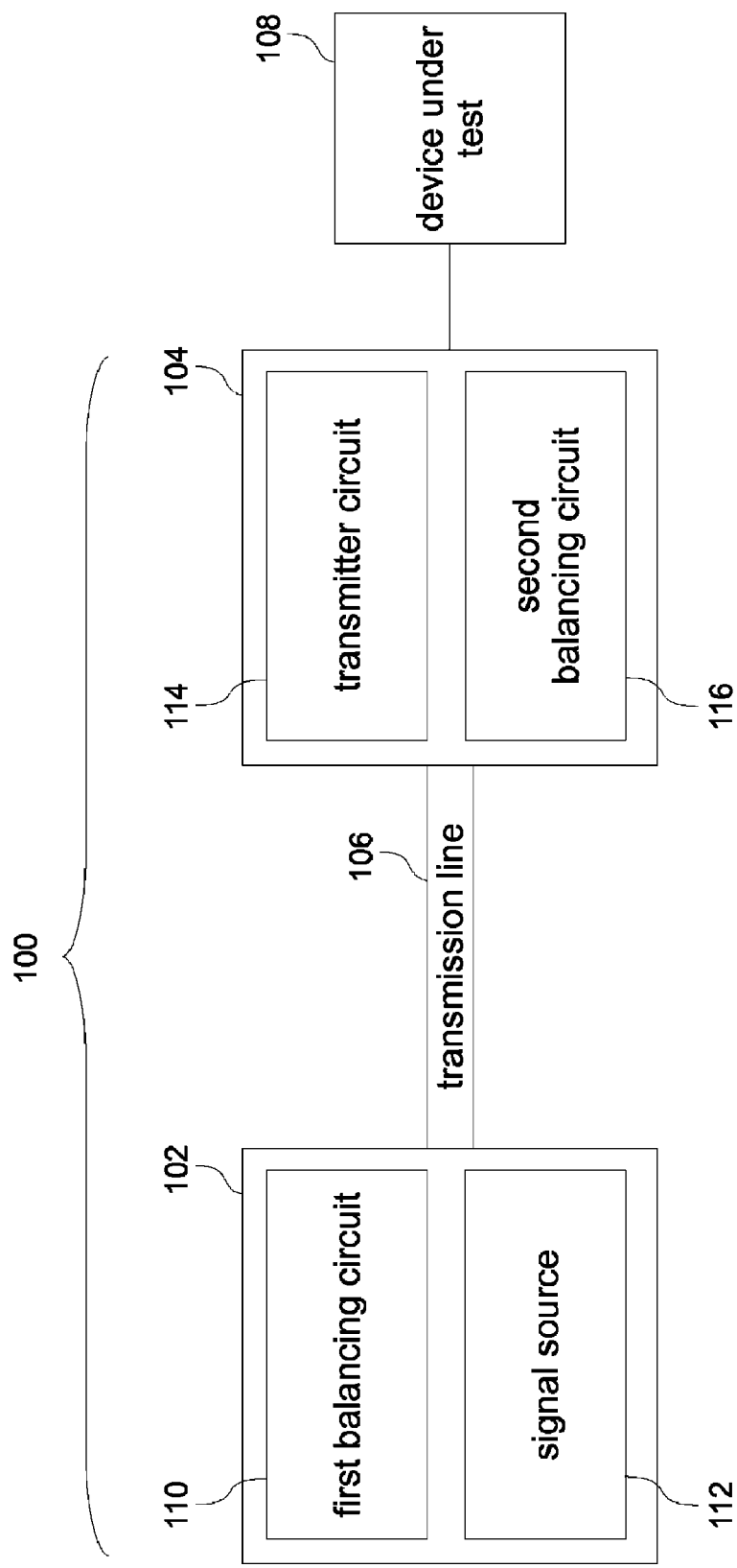
FIG. 1 depicts a test interface in accordance with an embodiment of the invention.

With reference to FIG. 1, a test interface 100 in accordance with an embodiment of the invention is shown. The test interface 100 includes a tester side circuit 102, and a device under test (DUT) side circuit 104 connected to the tester side circuit 102 via a transmission line 106. As described in more detail below, the test interface is configured to perform a scan test on a device under test (DUT) 108. The DUT side circuit may connect to the DUT or may be part of the DUT. As shown in FIG. 1, the tester side circuit includes a first balancing circuit 110 and a signal source 112. The DUT side circuit includes a transmitter circuit 114 and a second balancing circuit 116. The test interface may be terminated at the tester side circuit and/or at the device under test side circuit by, for example, at least a resistor.

In operation, the signal source 112 may be used to send a first test signal to a DUT via the transmission line 106 in order to perform a scan test. The first test signal may include test vectors that can be used to identify correct operation of the DUT. The test signal sent by the tester side circuit results in a second test signal being generated at the DUT side circuit and transmitted to the DUT. The second test signal is related to the first test signal or is the same as the first test signal. The first test signal is balanced out by the first balancing circuit such that no signal other than the first test signal transmitted to the DUT side circuit via the transmission line is being generated, as will be described in more detail with reference to FIG. 2. The transmitter circuit may transmit a response signal to the tester side circuit as a result of the DUT side circuit receiving the first test signal and transmitting a second test signal to the DUT, whereby the second test signal is related to or is the same as the first test signal. Data contained in the response signal (and/or the presence or absence of the response signal) will depend on the properties of the DUT, and whether or not the DUT is functioning properly. The response signal is balanced out by the second balancing circuit and does not influence the first test signal or the second test signal. The response signal is transmitted to the tester side circuit via the transmission line. The first balancing circuit receives the response signal and generates a test result signal related to the response signal. The test result signal provides information on possible faults present in the DUT, and the test result signal may be visualized in a tester connected to the tester side circuit. Alternatively, the tester side circuit may be part of the tester. The tester side circuit is arranged such that the test result signal is not influenced by the first test signal generated by the signal source. In one embodiment, the DUT side circuit is connected to the DUT via two pins and the transmission line includes only two wires.

Figure 2:
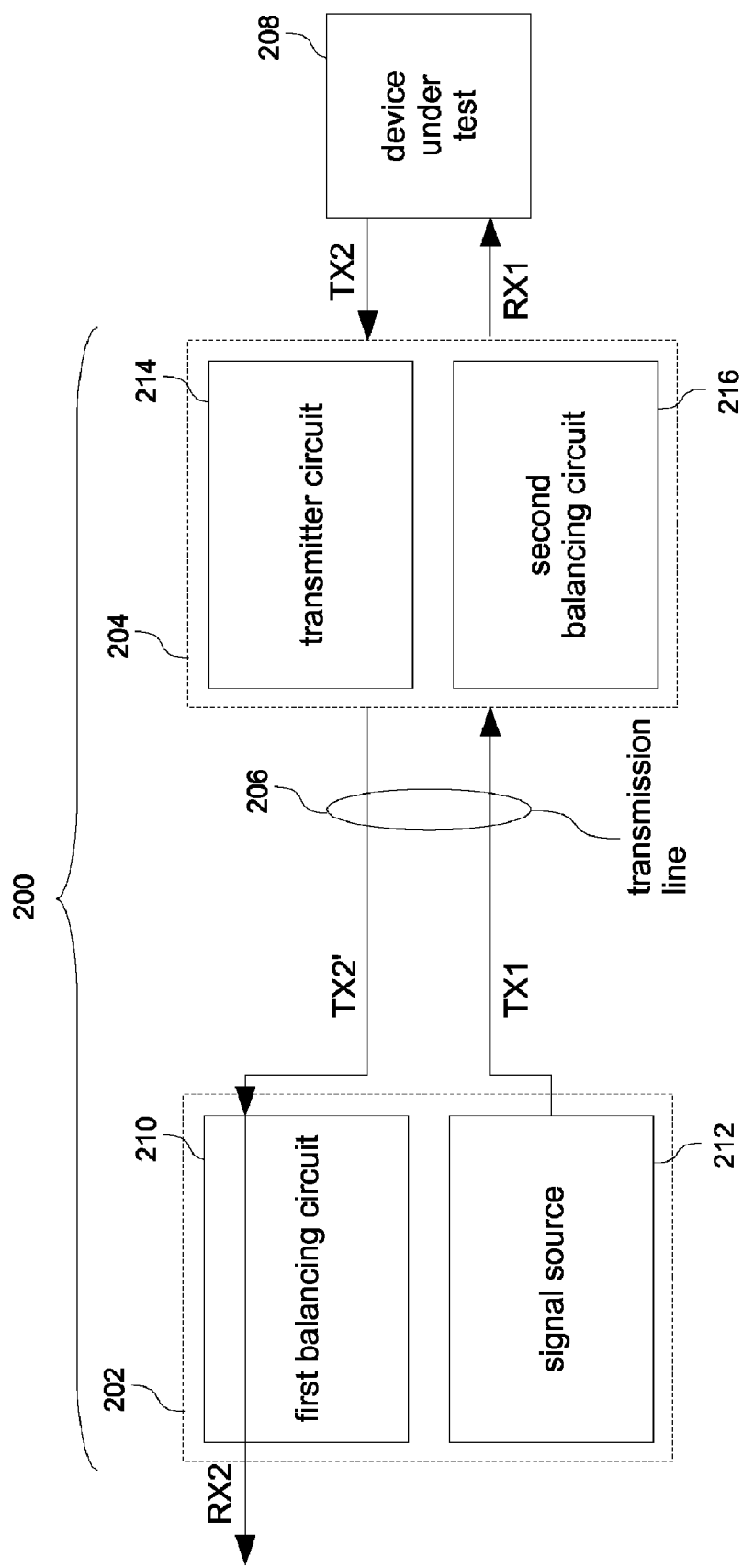
FIG. 2 illustrates transmissions between the test interface and a device under test in accordance with an embodiment of the invention.

Turning now to FIG. 2, transmissions between a test interface in accordance with an embodiment of the invention and a device under test are illustrated. Similar reference numbers to FIG. 1 indicate common elements in FIG. 2. As shown in FIG. 2, the test interface 200 includes a first balancing circuit 210 and a signal source 212 in a tester side circuit 202, a transmitter circuit 214 and a second balancing source 216 in a DUT side circuit 204, and a transmission line 206 to enable communication between the tester side circuit and the DUT side circuit. The tester side circuit 202 may be part of a scan test device or may be connected to a scan test device. The transmission line 206 may be, but is not limited to a cable. In an alternative embodiment, the transmission line may be a direct pin to pin or component to component connection. The DUT side circuit 204 may be an interface between the tester side circuit 202 and a DUT 208. The DUT side circuit may also be part of the DUT.

In one embodiment, the signal source 212 may be a voltage source. A first test signal TX1 is generated by the signal source 212 for performing a scan test on a DUT 208. The first test signal TX1 is sent to the DUT side circuit 204 via transmission line 206. In response to the first test signal TX1, the DUT side circuit generates a second test signal RX1, related to the first test signal TX1, and the DUT side circuit sends the second test signal RX1 to a DUT for scan testing. The DUT may then transmit a first response signal TX2 to the DUT side circuit. In response to the first response signal TX2, the transmitter circuit 216 generates a second response signal TX2', which is related to the first response signal TX2. The first balancing circuit 210 generates a test result signal RX2 in response to the second response signal TX2'.

The first balancing circuit 210 and the signal source 212 are arranged such that the test result signal RX2 is not sensitive to the first test signal TX1. That is, the test result signal RX2 is not influenced by the presence of the first test signal TX1 at the test side circuit. Similarly, the transmitter circuit 214 and the second balancing circuit 216 are arranged such that the second test signal RX1 generated at the DUT side circuit is not sensitive to the first response signal TX2. Therefore, full-duplex communication is possible between the tester side circuit 202, the DUT side circuit 204, and the DUT 208. The second response signal TX2' may be transmitted over the same supply wire of the transmission line as the first test signal TX1, and a second wire of the transmission line may be connected to ground. Furthermore, scan testing of two pin devices is possible with no additional pins required for the scan test.

In one embodiment, the first test signal TX1 may contain both clock and data via Manchester encoding. The second response signal TX2' may, in a non-limiting example, be Manchester encoded. In another embodiment, the second response signal TX2' may be non-return-to-zero (NRZ) encoded. When Manchester encoding is used to encode the response signal TX2' separate clock speeds may be used for sending and receiving data.

Figure 3:
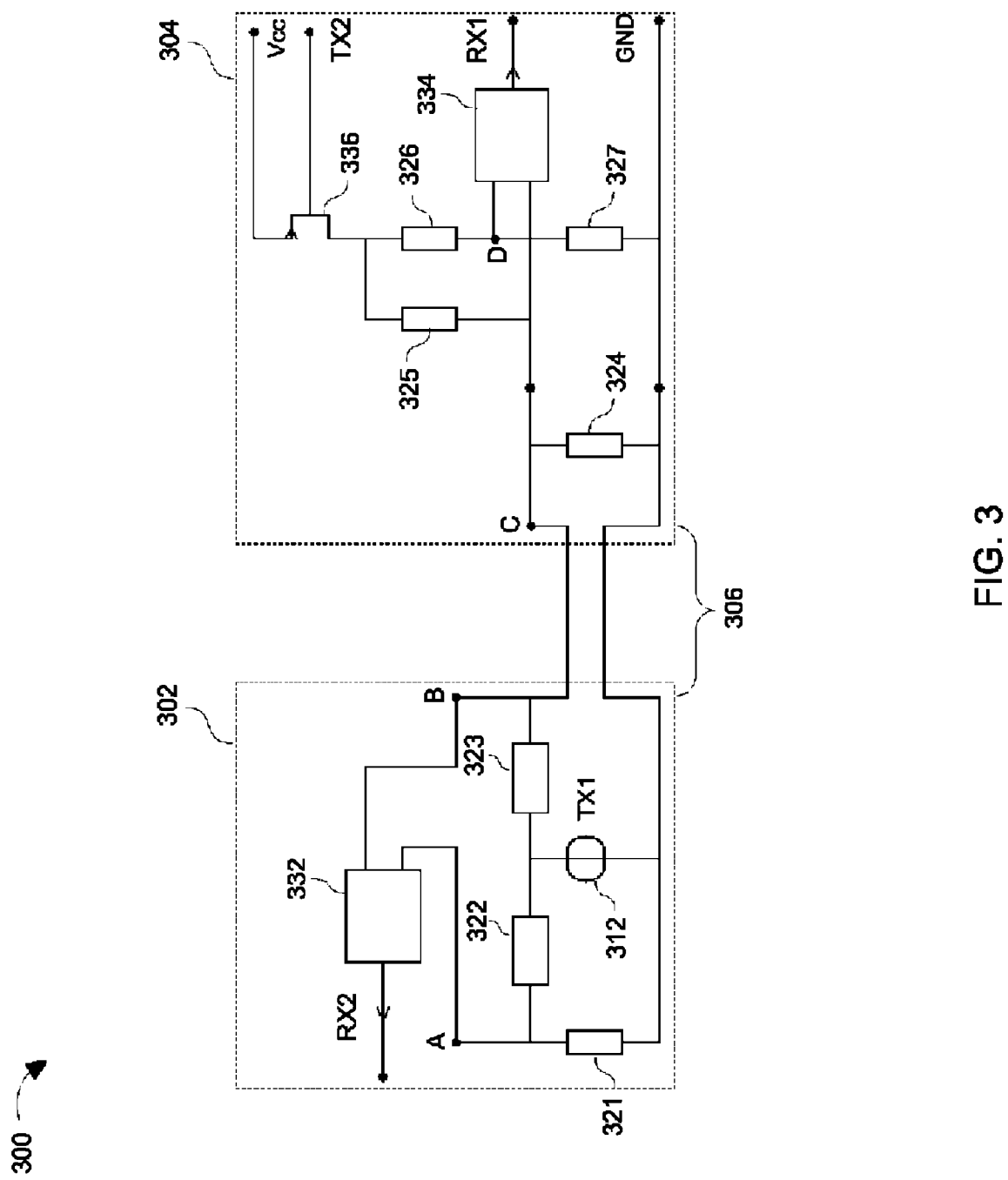
FIG. 3 depicts a test interface in accordance with another embodiment of the invention.

Turning now to FIG. 3, a test interface 300 in accordance with an embodiment of the invention is shown. The test interface 300 includes a tester side circuit 302 and a DUT side circuit 304. The tester side circuit includes a signal source 312, resistors 321 to 323, and a first comparator 332. The DUT side circuit includes resistors 324 to 327, a second comparator 334, and a transistor 336. The tester side circuit is connected to the DUT side circuit via a transmission line 306. The signal source 312 may be a voltage source or a current source.

The first comparator 332 and the second comparator 334 may be any circuit arrangement for comparing two input signals (voltages or currents) and for producing a corresponding output signal depending on the difference between the input signals. The comparator may, for example, switch its output signal to a first state (e.g. a certain voltage) when the difference between the input signals is substantially zero, and switch its output signal to a second state when the input signals differ. One of the input signals on a first input to the comparator may be a reference voltage (or current), whereby switching of the comparator output from one state to another occurs when the voltage on a second input to the comparator crosses the reference voltage (switching threshold). The comparator may have a hysteresis for preventing unwanted switching due to noise. In this case, the switching threshold is shifted depending on the state of the output. If, for example, the second input becomes more positive than the reference voltage, the output state changes correspondingly and the switching threshold is shifted negatively. The second input now has to cross the shifted switching threshold to produce another change in the state of the output. Any noise in the second input will not affect the state of the output as long as the noise is smaller than the difference between the current level of the second input and the shifted switching threshold. Once the second input becomes more negative than the shifted switching threshold, the output state is changed correspondingly again and the switching threshold is shifted positively (usually to its original level before the negative shifting). The difference between the original level and the shifted level of the switching threshold determines the noise sensitivity and should be larger than the noise, but smaller than the desired change of the second input at which switching should occur. Transistors connected to the first input may be used to provide the automatic shifting of the switching threshold depending on the output signal.

In the example of FIG. 3, the transmission line 306 has a characteristic impedance $Z_0$ and is terminated at the DUT side circuit by resistor 324. Termination of the transmission line allows high speed test access independently of the length of the transmission line. The resistors 321 and 324 and/or the characteristic impedance of the transmission line are chosen such that the impedance looking into the transmission line from the tester side circuit is equal to the resistance of the resistor 321. Thus, a first test signal TX1 generated by the signal source 312 will result in a voltage across resistor 321 (at node A with respect to ground) that is equal to a voltage across the input of the transmission line (at node B with respect to ground). Therefore, a differential signal at the first comparator 332 as a result of the first test signal TX1 will be zero and is therefore canceled out. In a non-limiting example, resistances of resistors 321 and 324 and the characteristic impedance of the transmission line are all of equal value and resistor 322 has the same value as resistor 323. Typical values for the resistors 321 and 324 are 50 Ohm with the transmission line having a characteristic impedance of 50 Ohm. Because the signal generated by the signal source is canceled out at the comparator, there is no contribution from the first test signal TX1 to the output of the comparator 332 and the presence of the first test signal TX1 does not influence the output signal of the comparator 332.

In the example of FIG. 3, a first response signal TX2 received at transistor 336 results in a voltage V2 created at node C (with respect to ground). Voltage V2 is transmitted to the tester side circuit 302, resulting in a voltage V1 at node B. However, the voltage V1 is not present at node A, and thus a differential signal is present at the input to the comparator 332. Thus, the first response signal TX2 at the DUT side circuit results in a test result signal RX2 at the output of the comparator 332. Similarly, the first test signal TX1 will create a differential signal at the comparator 334 of the DUT side circuit.

The DUT side circuit is arranged to cancel the first response signal TX2 at the DUT side circuit and transmit the first response signal TX2 to the tester side circuit. Resistors 325-327 are chosen such that the first response signal TX2 does not contribute to a differential signal at the inputs of the comparator 334. In a non-limiting example, resistance values R4 of resistor 324, R5 of resistor 325, R6 of resistor 326, and R7 of resistor 327 may be chosen such that $2*R5/R4=R6/R7$. Because the presence of the first test signal TX1 is not seen at the input of the comparator 332 and the presence of the first response signal TX2 is not seen at the input of the comparator 334, the first test signal TX1 does not influence communication between the DUT and the tester side circuit. Similarly, the first response signal TX2 does not influence communication between the tester side circuit and the DUT. Therefore, simultaneous communication in both directions is possible.

Figure 4:
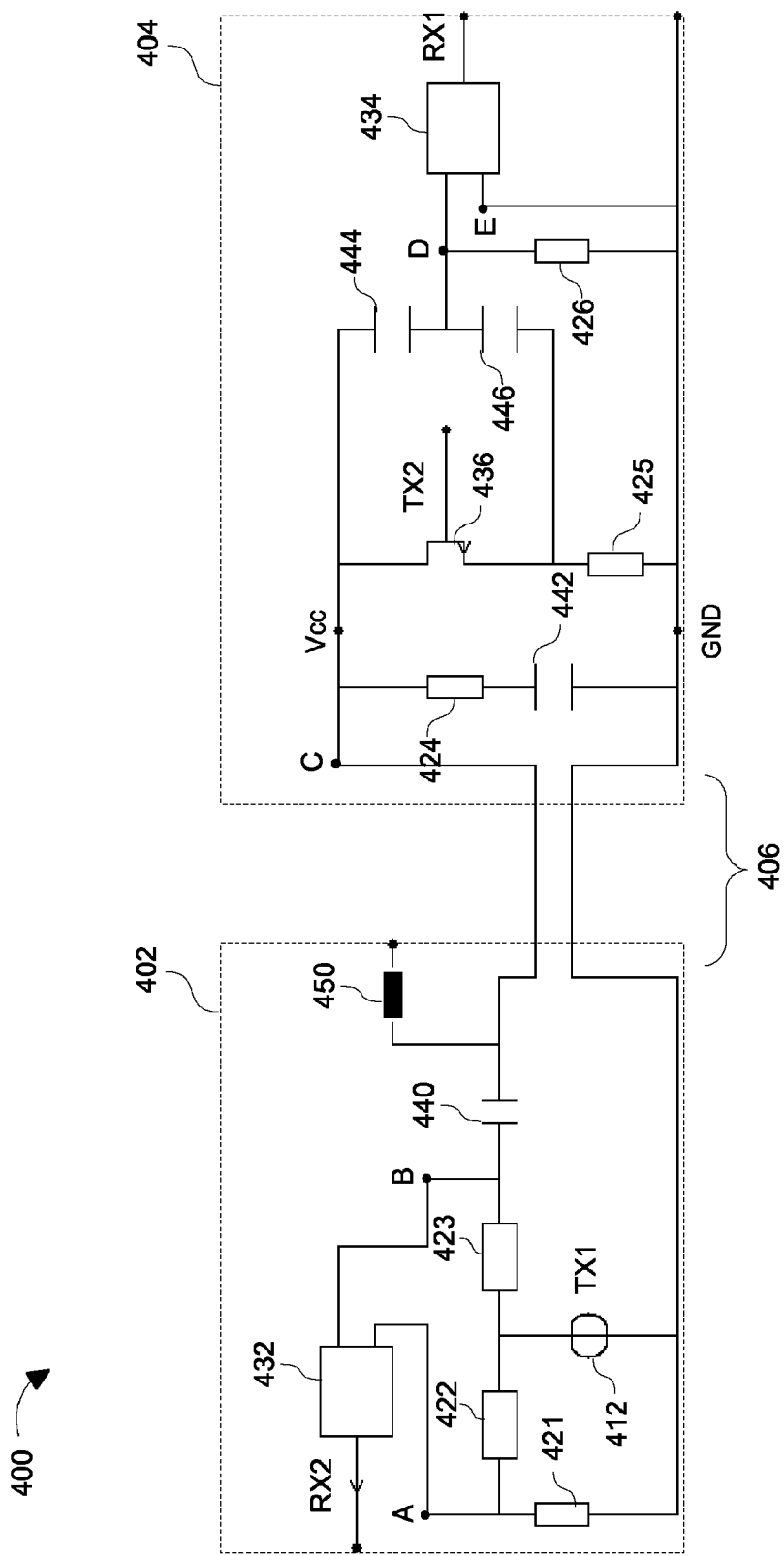
FIG. 4 depicts a test interface in accordance with another embodiment of the invention.

Turning now to FIG. 4, a test interface 400 in accordance with another embodiment of the invention is shown. FIG. 4 illustrates a full duplex, high speed test interface for a two pin device. The AC communication signals to and from the tester may be superimposed on the supply line, as will be described in more detail below. Similar reference numbers to FIG. 3 indicate common elements in FIG. 4. As shown in FIG. 4, the test interface 400 includes a tester side circuit 402 and a DUT side circuit 404. The tester side circuit includes a signal source 412, resistors 421-423, a first comparator 432, a capacitor 440, and an inductor 450. The DUT side circuit 404 includes resistors 424-426, a second comparator 434, a transistor 436, and capacitors 442, 444, and 446. The tester side circuit is connected to the DUT side circuit via a transmission line 406.

In the example of FIG. 4, signals sent from the tester side circuit 402 to the DUT side circuit 404 and from the DUT side circuit to the tester side circuit are combined on the same wire as the supply voltage. A termination resistor 424 is provided at the DUT side circuit and is coupled to the transmission line 406 via a capacitor 442. The signal source 412 is AC coupled through capacitor 440. In one embodiment, the first test signal TX1 generated by the signal source is Manchester encoded, where the information is encoded in the signal transitions, and thus the signal has no DC component. The comparator 434 at the DUT side circuit is arranged such that the first test signal TX1 from the tester side circuit results in a differential signal at the input of the comparator 434. The capacitor 444 is arranged to remove any DC component from the input at node D of the comparator 434.

In the example of FIG. 4, a first response signal TX2 causes a supply current to flow through the transistor 436, typically in the range of 5 mA to 20 mA. The first response signal TX2 results in a voltage V2 at node C. The DUT side circuit is arranged to cancel the contribution of the first response signal TX2 to the input of the comparator 434. Therefore, comparator 434 is not sensitive to the first response signal TX2. In one embodiment, the comparator 434 has a certain hysteresis for preventing the DUT side circuit from becoming sensitive to noise, as described above with reference to FIG. 3.

In the example of FIG. 4, balancing of the first response signal at the input to the comparator 434 is performed by capacitor 446 and resistor 425. In a non-limiting example, resistor 425 has a resistance of 100 Ohm, and resistor 424 has a resistance of 50 Ohm. With a characteristic impedance of the transmission line of 50 Ohm, the impedance looking into the transmission line from the DUT side circuit is 25 Ohm. With capacitor 444 having a capacitance of 2 pF and capacitor 446 having a capacitance of 0.5 pF in this example, the voltage at the input to the comparator 434 is canceled resulting in the voltages at nodes D and E being equal. The voltage at node D is independent of the first response signal TX2 and thus, when the first test signal TX1 is not present, the voltage at node D is zero, even if the first response signal TX2 is present. Therefore, the net contribution from the first response signal TX2 to the differential input of the comparator 434 is zero. The net contribution from the first test signal TX1 to the differential input of the comparator 432 is also zero, as discussed above with reference to FIG. 3. Since the own transmitted signals of the tester side circuit and the DUT side circuit are balanced out at the tester side circuit and the DUT side circuit, respectively, simultaneous communication in both directions is possible.

In one embodiment, as depicted in FIG. 4, the source of the transistor 436 is connected to the resistor 425. In another embodiment, the source of the transistor 436 is not directly connected to the resistor 425. Instead, a copy of the drain current of the transistor 436 is made with, for example, a current mirror (not shown) and the copy of the drain current is supplied into the resistor 425.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more feature.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A test circuit comprising:
    a tester side circuit including:
        a first balancing circuit, and
        a signal source coupled to said first balancing circuit, said signal source configured to generate a first test signal;
    wherein the first balancing circuit is configured to produce a test result signal as a result of a response signal, said response signal being a consequence of a device under test receiving a second test signal related to said first test signal;
    wherein said test result signal is independent of said first test signal; and
    wherein the test circuit is configured to be connected to the device under test via only two pins;
    wherein the first test signal includes a data signal to perform a scan test on the device under test, wherein the first test signal further includes a clock signal, wherein the data signal and the clock signal are transmitted over a same wire.

2. The test circuit of claim 1 further comprising:
    a device under test interface including:
        a second balancing circuit;
    wherein the second balancing circuit is configured to produce said second test signal as a result of receiving said first test signal from said signal source;
    wherein the second test signal is independent of the response signal; and
    wherein the device under test interface is disposed between the tester side circuit and the two pins.

3. The test circuit of claim 2, wherein the tester side circuit and the device under test interface are connected via a transmission line, wherein said first test signal and said response signal are transmitted over the transmission line.

4. The test circuit of claim 3, wherein the first test signal and the response signal are transmitted over the same wire of the transmission line.

5. The test circuit of claim 4, wherein the first test signal includes a data signal to perform a scan test on the device under test, wherein the first test signal further includes a clock signal.

6. The test circuit of claim 3, wherein the transmission line is terminated at the device under test interface and/or the tester side circuit.

7. The test circuit of claim 3, wherein the transmission line is a cable having a characteristic impedance of approximately 50 Ohm.

8. The test circuit of claim 2, wherein the second test signal is transmitted to the device under test via a first pin of the device under test, and further wherein the response signal is received from the device under test via a second pin of said device under test.

9. The test circuit of claim 8, wherein said first pin is the supply pin of the device under test, wherein the second test signal is superimposed on a supply signal to the device under test via said supply pin.

10. The test circuit of claim 2, wherein the first balancing circuit is configured to cancel the first test signal at the tester side circuit and transmit said first signal to the device under test interface.

11. The test circuit of claim 10, wherein the first balancing circuit includes a first comparator to cancel the signal from the signal source.

12. The test circuit of claim 2, wherein the second balancing circuit is configured to transmit said second test signal to the device under test, cancel the response signal at the device under test interface, and transmit the response signal to the tester side circuit.

13. The test circuit of claim 12, wherein the second balancing circuit includes a second comparator to cancel the signal from the signal source.

14. The test circuit of claim 13, wherein the second comparator experiences a hysteresis.

15. The test circuit of claim 1, wherein the clock signal is included in the first test signal via Manchester encoding.

16. The test circuit of claim 15, wherein the second test signal is non-return-to-zero encoded or Manchester encoded.

17. A test circuit comprising:
    a tester side circuit including:
        a first balancing circuit, and
        a signal source coupled to said first balancing circuit, said signal source configured to generate a first test signal;
    wherein the first balancing circuit is configured to produce a test result signal as a result of a response signal, said response signal being a consequence of a device under test receiving a second test signal related to said first test signal;
    wherein said test result signal is independent of said first test signal; and
    wherein the test circuit is configured to be connected to the device under test via only two pins;
    a device under test interface including:
        a second balancing circuit;
    wherein the second balancing circuit is configured to produce said second test signal as a result of receiving said first test signal from said signal source;
    wherein the second test signal is independent of the response signal; and
    wherein the device under test interface is disposed between the tester side circuit and the two pins;
    wherein the tester side circuit and the device under test interface are connected via a transmission line, wherein said first test signal and said response signal are transmitted over the transmission line;
    wherein the first test signal and the response signal are transmitted over the same wire of the transmission line; and
    wherein the first test signal includes a data signal to perform a scan test on the device under test, wherein the first test signal further includes a clock signal.

* * * * *